US006498427B1

(12) United States Patent
Song et al.

(10) Patent No.: US 6,498,427 B1
(45) Date of Patent: Dec. 24, 2002

(54) COLOR CATHODE RAY TUBE DYNAMIC FOCUS ELECTRON GUN HAVING ELONGATED BEAM PASSING HOLES FOR COMPENSATING FOR ELECTRON BEAM DISTORTION

(75) Inventors: Yong-Seok Song, Ulsan (KR); Yong-Geol Kwon, Suwon (KR); Myeong-Hwan Lee, Osan (KR); Kwang-Jin Yun, Kunpo (KR); Woo-Seok Huh, Seoul (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/328,264

(22) Filed: Jun. 17, 1999

(30) Foreign Application Priority Data

Dec. 11, 1998 (KR) ........................................... 98-54524

(51) Int. Cl.[7] ......................... G01J 29/50; G01J 29/58; G01J 29/48

(52) U.S. Cl. ...................... 313/414; 313/309; 313/441; 315/382; 315/382.1

(58) Field of Search ................................ 313/414, 409, 313/412, 411, 415, 441, 444, 449, 460; 315/14, 382, 382.1, 368.15, 412

(56) References Cited

U.S. PATENT DOCUMENTS

| | | | | |
|---|---|---|---|---|
| 4,814,670 A | * | 3/1989 | Suzuki et al. | 315/15 |
| 4,945,284 A | * | 7/1990 | Shimoma et al. | 313/414 |
| 4,967,120 A | * | 10/1990 | Katsuma et al. | 315/328 |
| 5,025,189 A | * | 6/1991 | Son | 313/414 |
| 5,036,258 A | * | 7/1991 | Chen et al. | 315/382 |
| 5,055,749 A | * | 10/1991 | Chen et al. | 315/368 R |
| 5,281,896 A | * | 1/1994 | Bae et al. | 315/15 |
| 5,300,855 A | * | 4/1994 | Kweon | 313/414 |
| 5,760,550 A | * | 6/1998 | Sukeno et al. | 315/382.1 |
| 5,831,399 A | * | 11/1998 | Ohta et al. | 315/382.1 |
| 6,094,004 A | * | 7/2000 | Kim et al. | 313/414 |
| 6,144,150 A | * | 11/2000 | Ueda et al. | 313/414 |
| 6,172,450 B1 | * | 1/2001 | Natori et al. | 313/414 |

FOREIGN PATENT DOCUMENTS

JP 02087446 A * 3/1990 ............ G01J/29/50

* cited by examiner

*Primary Examiner*—Nimeshkumar D. Patel
*Assistant Examiner*—Mariceli Santiago
(74) *Attorney, Agent, or Firm*—Lowe Hauptman Gilman & Berner, LLP

(57) ABSTRACT

A dynamic focus electron gun for a color cathode ray tube including a cathode, a control electrode and a screen electrode, which constitute a triode, a first focusing electrode having three vertically elongated electron beam through-holes formed through its emitting surface, a second focusing electrode which constitutes a quadrupole lens together with the first focusing electrode and having three circular electron beam through-holes formed through its entering surface facing the emitting surface of the first focusing electrode, and a final accelerating electrode installed adjacent to the second focusing electrode and constituting a main electronic lens together with the second focusing electrode.

4 Claims, 8 Drawing Sheets

COLOR CATHODE RAY TUBE DYNAMIC FOCUS ELECTRON GUN HAVING ELONGATED BEAM PASSING HOLES FOR COMPENSATING FOR ELECTRON BEAM DISTORTION

BACKGROUND OF THE INVENTION

1. Field of the Invention

The present invention relates to an electron gun for a color cathode ray tube, and more particularly, to a dynamic focus electron gun for a color cathode ray tube with improved electron beam through-holes for forming a quadrupole lens.

2. Description of the Related Art

An electron gun installed in a neck portion of a cathode ray tube emits thermions for exciting a phosphor layer. The performance of the cathode ray tube is influenced by the state in which the electron beams emitted from the electron gun land on the phosphor layer. Thus, electron guns for improving focus characteristics so that the electron beams emitted from the electron gun land precisely at a predetermined position of the phosphor layer and for reducing aberration of an electronic lens have been developed.

FIG. 1 shows an example of such a conventional electron gun for a color cathode ray tube.

The electron gun includes a cathode 2, a control electrode 3 and a screen electrode 4, which constitute a triode, first, second, third, fourth and fifth focusing electrodes 5, 6, 7, 8 and 9 sequentially arranged adjacent to the triode and constituting an auxiliary electrostatic lens, and a final accelerating electrode 10 installed adjacent to the fifth focusing electrode 9 and constituting a main electronic lens.

As shown in FIG. 2, vertically elongated electron beam through-holes 7*b* and horizontally elongated electron beam through-holes 8*a*, for forming a quadrupole lens, are formed on an emitting surface of the third focusing electrode 7 and an entering surface of the fourth focusing electrode 8, respectively. Also, as shown in FIG. 3, vertically elongated electron beam through-holes 8*b* are formed on the emitting surface of the fourth focusing electrode 8 and vertically elongated electron beam through-holes 9*a* are formed on the entering surface of the fifth focusing electrode 9. Blades 9*c* inserted into the electron beam through-holes 8*b* formed on the emitting surface of the fourth focusing electrode 8 are formed at upper and lower edges of the electron beam through-holes 9*a* formed on the entering surface of the fifth focusing electrode 9.

In the electron gun for a color cathode ray tube constructed as described above, since electron beam through-holes 7*b*, 8*a*, 8*b* and 9*a* must be formed within the limited diameter of a neck portion, the distance between electron beam through-holes is very small. For example, since the widths (w) of bridges among the horizontally elongated electron beam through-holes 8*a* are very small, i.e., 0.4~0.6 mm, these bridges are easily deformed by external forces.

Also, when a first quadrupole lens is produced, the vertical convergent force becomes weak due to the horizontally elongated electron beam through-holes 8*a* formed on the entering surface of the fourth focusing electrode 8, a high dynamic voltage must be supplied to the electrode in order to attain a desired vertical focusing force. Also, since the blades 9*c* must be formed at upper and lower edges of the electron beam through-holes 9*a* of the fifth focusing electrode 9, electrode fabrication is quite difficult.

An example of another conventional electron gun is illustrated in FIG. 4.

Referring to the drawing, three electron beam through-holes 12 are formed on an emitting surface of a first focusing electrode 11 constituting a quadrupole lens, and a horizontally elongated electron beam through-hole 14 through which three electron beams pass is formed on an entering surface of a second focusing electrode 13 opposed to the first focusing electrode 11 and constituting the quadrupole lens together with the first focusing electrode 11. A focusing voltage VF which is a static voltage is applied to the first focusing electrode 11, and a dynamic focusing voltage VD varying synchronously with a deflection signal is applied to the second focusing electrode 13.

In the above-described electron gun, since a single horizontally elongated electron beam through-hole (14 of FIG. 4) is formed in the second focusing electrode 13, the intensities, i.e., the magnifications, of the center and both ends of an electronic lens produced by the first and second focusing electrodes 11 and 13 are different. Thus, the sizes of electron beam spots Sanding on left and right sides of a screen become different, which causes a moire phenomenon.

SUMMARY OF THE INVENTION

To solve the above problems, it is an objective of the present invention to provide a dynamic focus electron gun for a color cathode ray tube which can lower the required dynamic focus voltage and improve the resolution of an image by preventing a moire phenomenon.

Accordingly, to achieve the above objective, there is provided a dynamic focus electron gun for a color cathode ray tube including a cathode, a control electrode and a screen electrode, which constitute a triode, a first focusing electrode having three vertically elongated electron beam through-holes formed through its emitting surface, a second focusing electrode which constitutes a quadrupole lens se together with the first focusing electrode and having three circular electron beam through-holes formed through its entering surface facing the emitting surface of the first focusing electrode, and a final accelerating electrode installed adjacent to the second focusing electrode and constituting a main electronic lens together with the second focusing electrode.

According to another aspect of the present invention, circular or regular-polygonal electron beam through-holes are formed on the first focusing electrode, and regular-polygonal or horizontally elongated electron beam through-holes are formed on the second focusing electrode.

According to still another aspect of the present invention, there is provided a dynamic focus electron gun for a color cathode ray tube including a cathode, a control electrode and a screen electrode, which constitute a triode, first and second focusing electrodes sequentially installed from the screen electrode, a third focusing electrode having vertically elongated electron beam through-holes formed through its emitting surface, a fourth focusing electrode having circular electron beam through-holes formed through its entering surface facing the emitting surface of the third focusing electrode and vertically elongated electron through-holes formed through its emitting surface, a fifth focusing electrode and having circular electron beam through-holes formed through its entering surface facing the emitting surface of the fourth focusing electrode, and a final accelerating electrode installed adjacent to the fifth focusing electrode, and wherein a static voltage is applied to the screen electrode and the second focusing electrode, a focus voltage higher than the static voltage is applied to the first and fourth electrodes, and a dynamic focus voltage varying synchronously with a deflection signal and equal to or higher than the focus voltage is applied to the third and fifth focusing electrodes.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Figure 1:
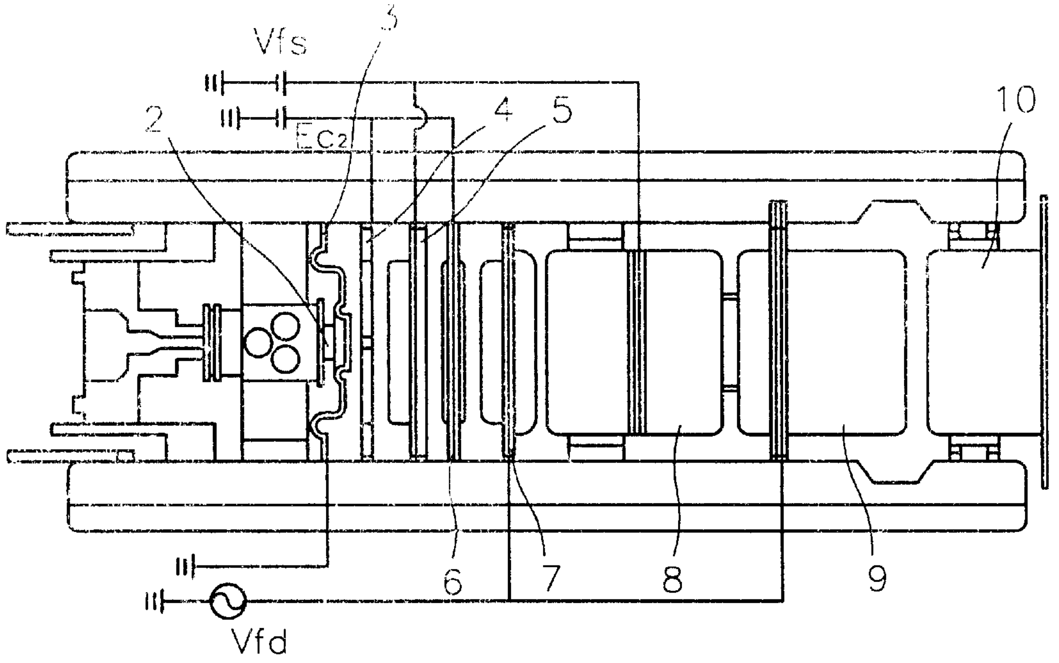
FIG. 1 (PRIOR ART)
FIG. 1 is a side view illustrating a conventional electron gun for a color cathode ray tube.
Figure 5:
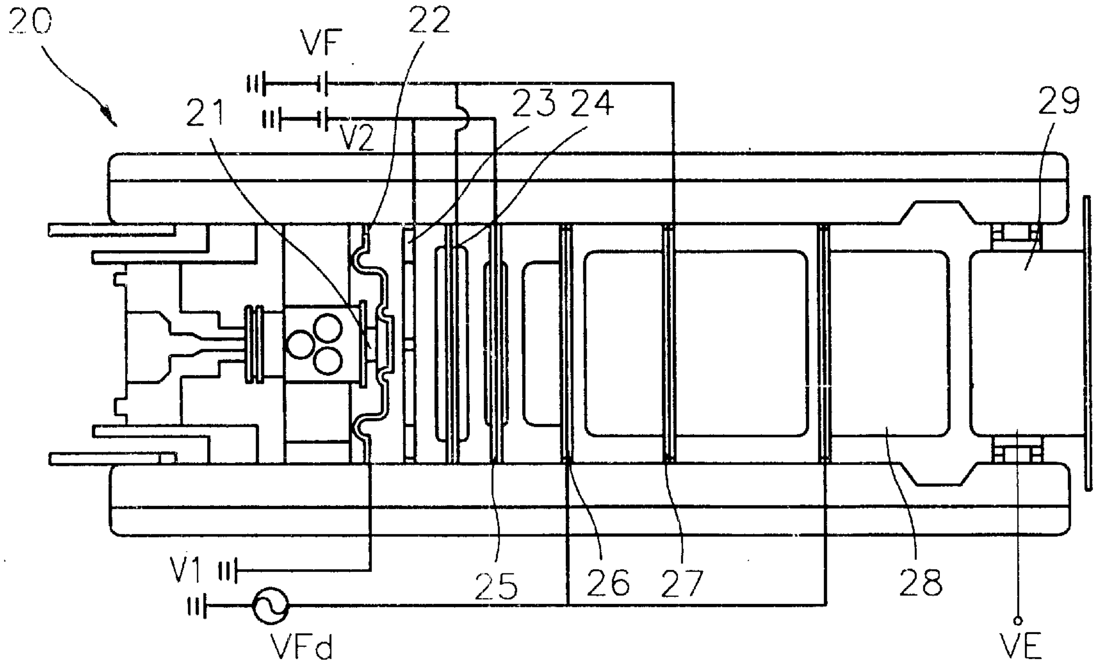
FIG. 5 is a side view illustrating an electron gun for a cathode ray tube according to an embodiment of the present invention.
Figure 2:
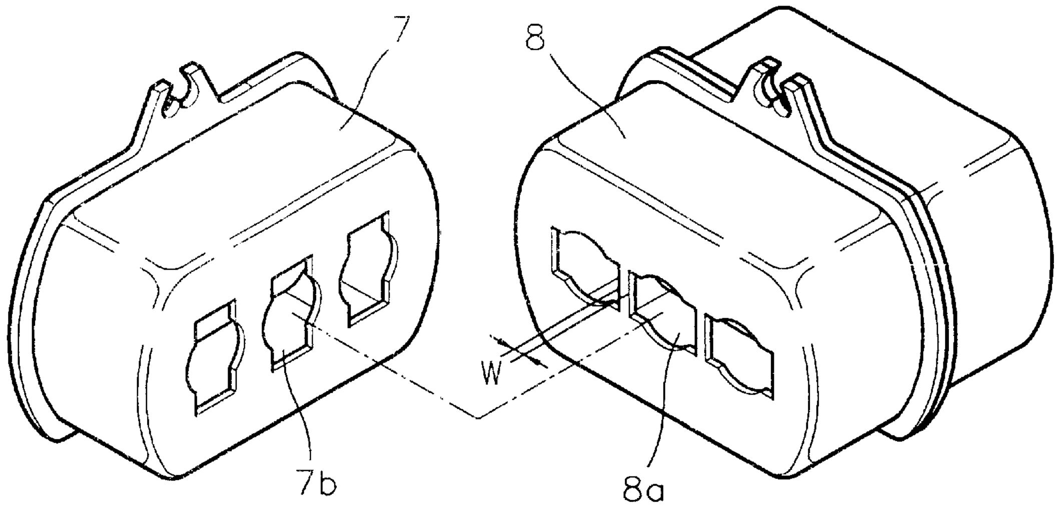
FIG. 2 (PRIOR ART)
FIGS. 2 and 3 are exploded perspective views illustrating electrodes for forming a quadrupole lens and electron beam through-holes shown in FIG. 1.
Figure 3:
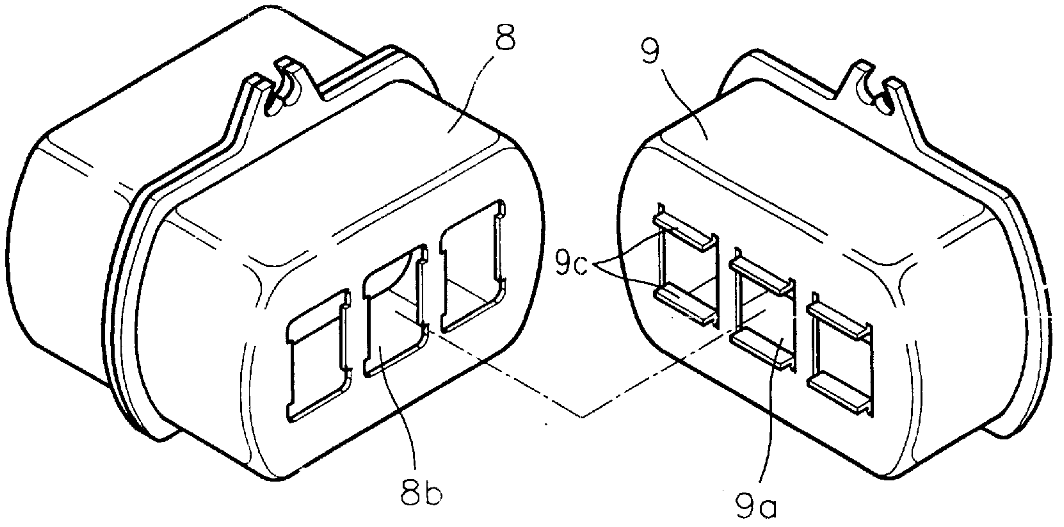
FIG. 3 (PRIOR ART)
Figure 4:
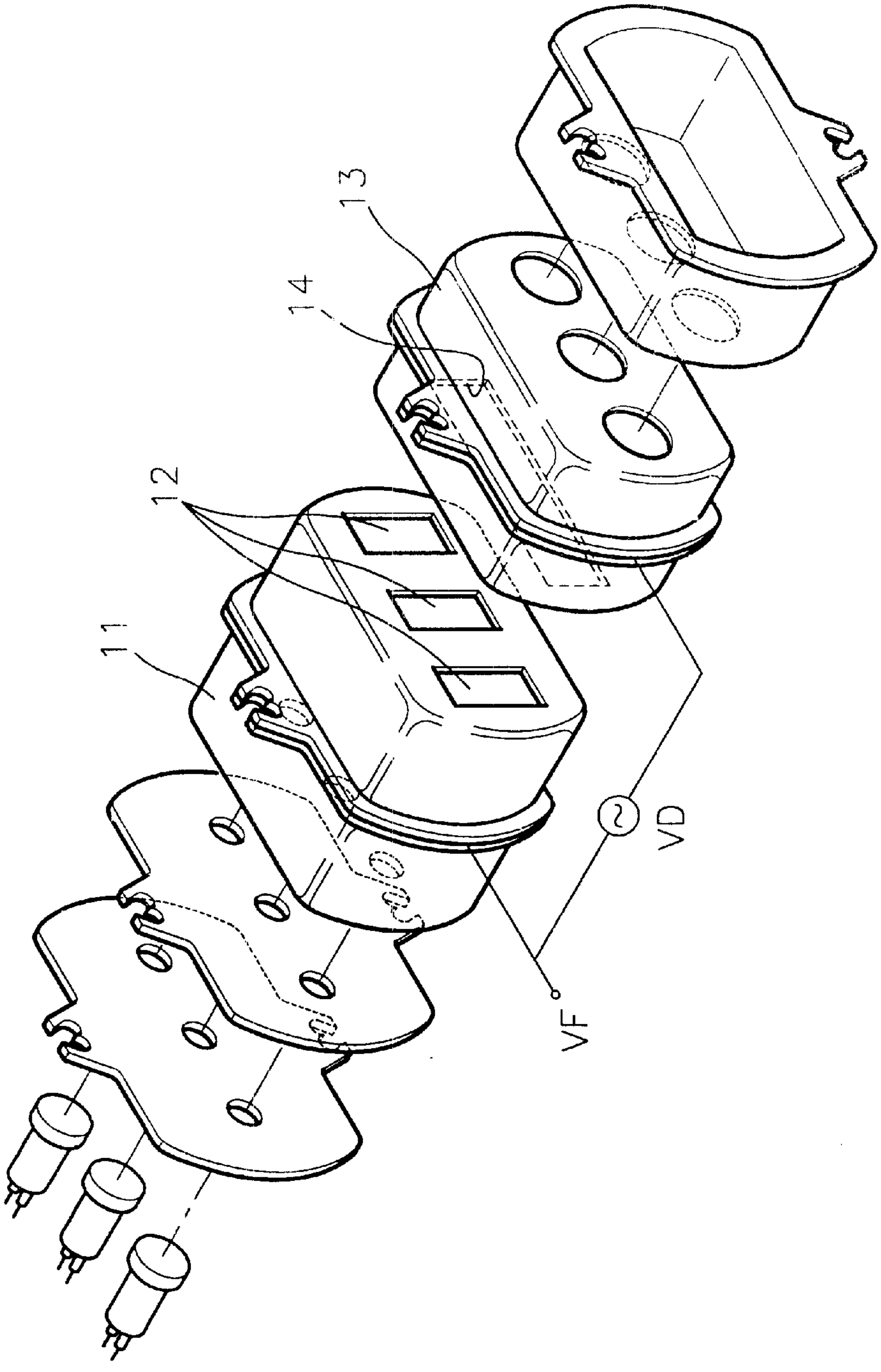
FIG. 4 (PRIOR ART)
FIG. 4 is a side view illustrating another conventional electron gun for a cathode ray tube.

FIG. 5 illustrates an electron gun for a cathode ray tube according to an embodiment of the present invention.

As shown in the drawing, the electron gun includes a cathode 21, a control electrode 22 and a screen electrode 23, which constitute a triode, first, second, third, fourth and fifth focusing electrodes 24, 25, 26, 27 and 28, which constitute an auxiliary electronic lens and first and second quadrupole lenses, and a final accelerating electrode 29 installed adjacent to the fifth focusing electrode 28 and constituting a main electronic lens having a focus lens and a convergence lens.

Three electron beam through-holes in an in-line arrangement or a single electron beam through-hole through which three electron beams pass are formed in the respective electrodes.

Figure 6:
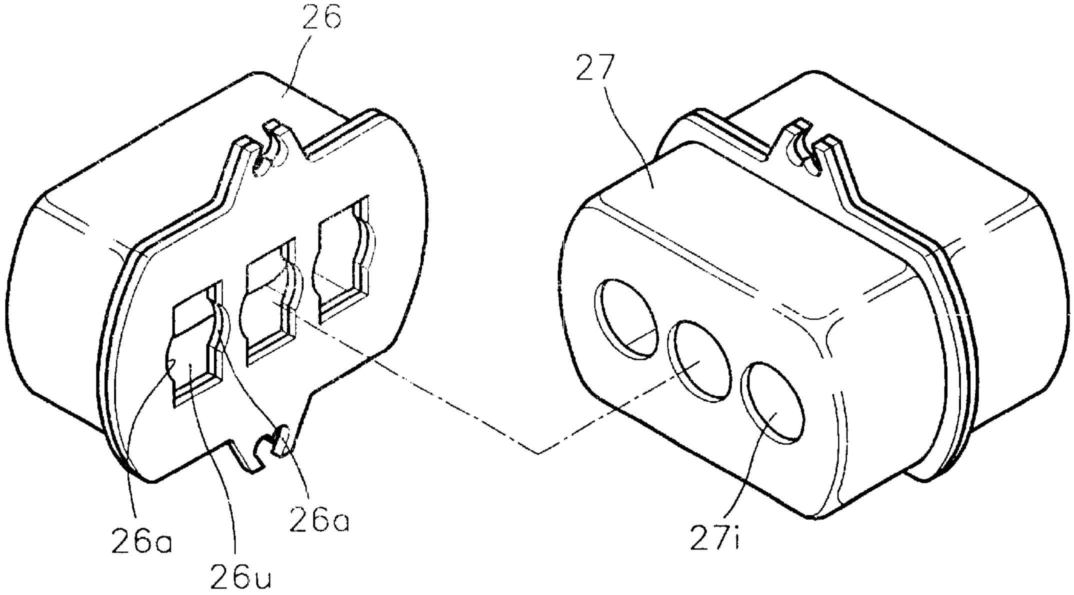
FIG. 6 is an exploded perspective view illustrating electrodes for forming a quadrupole lens employed in the electron gun shown in FIG. 5.
Figure 7:
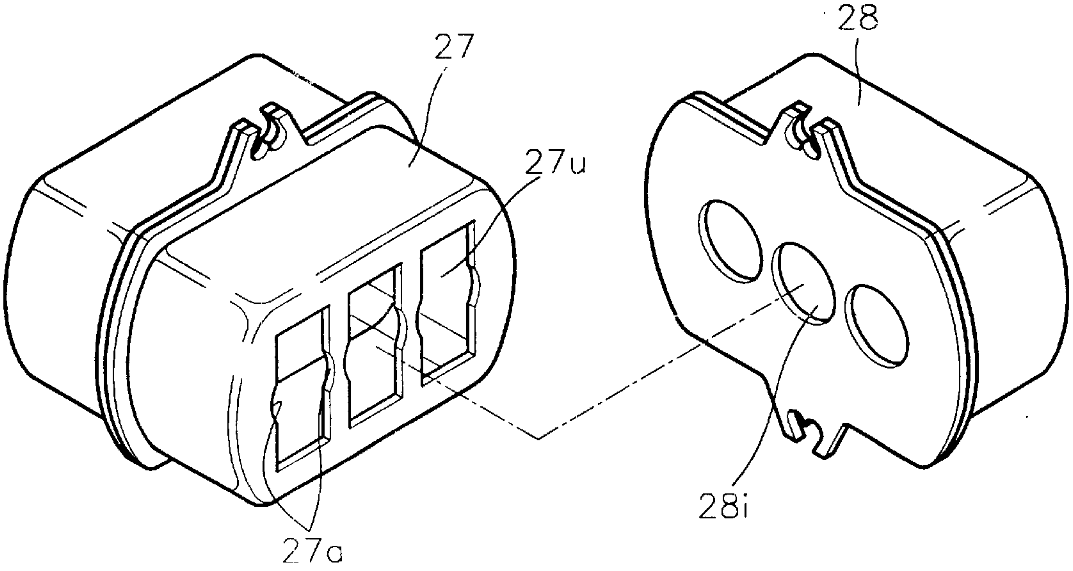
FIG. 7 is an exploded perspective view illustrating another example of electrodes for forming a quadrupole lens employed in the electron gun shown in FIG. 5.

According to the feature of the present invention, as shown in FIGS. 6 and 7, vertically elongated electron beam through-holes 26*u* and 27*u* are formed through the emitting surfaces of the third and fourth focusing electrodes 26 and 27, respectively, and circular electron beam through-holes 27*i* and 28*i* are formed through the entering surfaces of the fourth and fifth focusing electrodes 27 and 28, respectively. Recessed portions 26*a* and 27*a* are formed at vertical edges of the vertically elongated electron beam through-holes 26*u* and 27*u*. The recessed portions 26*a* and 27*a* are preferably formed to be symmetrical with each other. The electron gun according to the present invention may include three focusing electrodes as demand dictates.

During the operation of the electron gun, a first static voltage V1 is applied to the control electrode 22, and a second static voltage V2 higher than the first static voltage V1 is applied to the screen electrode 23 and the second focusing electrode 25. Also, a focus voltage VF higher than the second static voltage V2 is applied to the first and fourth focusing electrodes 24 and 27, a parabola dynamic focus voltage VFd higher than or equal to the focus voltage VF varying synchronously with a deflection signal is applied to the third and fifth electrodes 26 and 28, and a high-voltage anode voltage VE is applied to the final accelerating electrode 29. Thus, the relationship between the voltage levels is as follows:

$$V1<V2<VF\leqq VFd<VE.$$

The voltage levels applied to the respective electrodes are not restricted to those in the above-described embodiment and adequate voltages may be supplied to the electrodes so as to focus electron beams by forming at least two quadrupole lenses.

Figure 8:
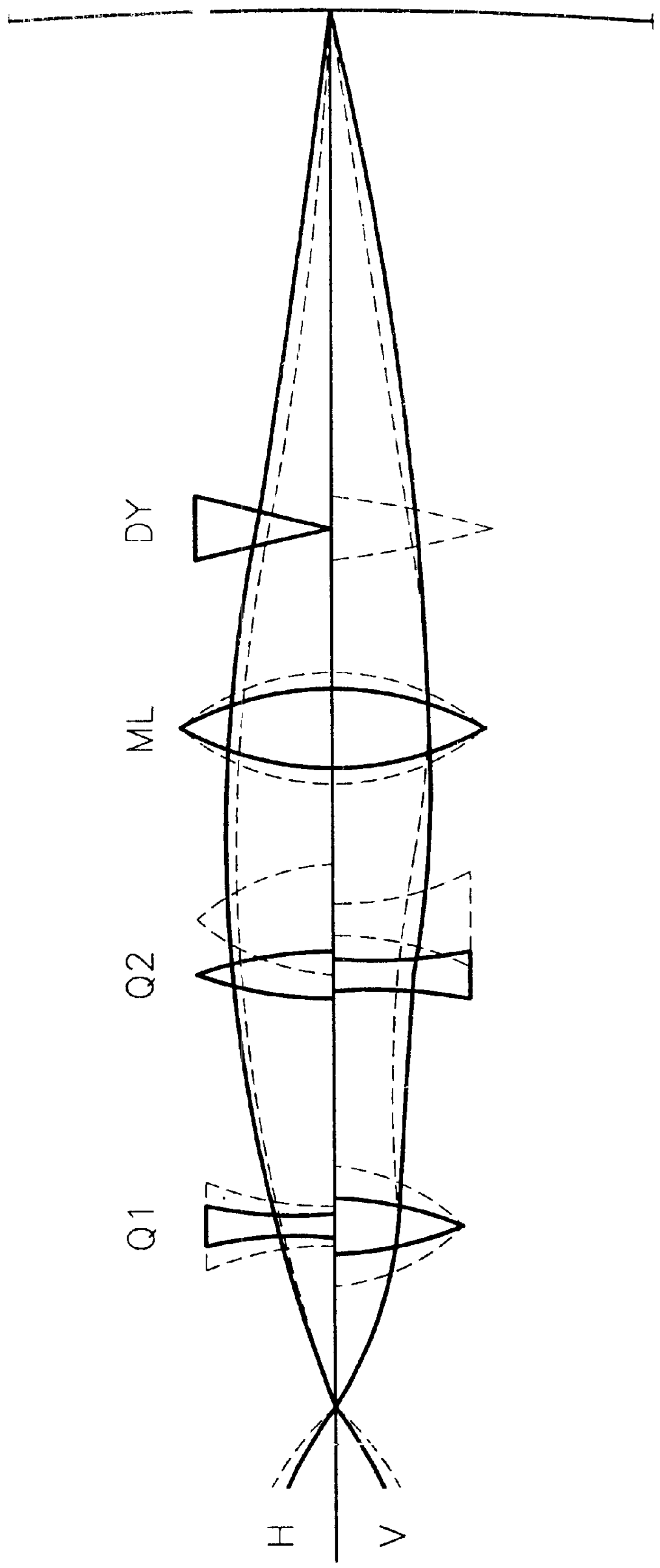
FIG. 8 illustrates lenses produced in the electron gun shown in FIG. 5 and the path of electron beams passing through the lenses.

The operation of the above-described dynamic focus electron gun for a color cathode ray tube according to this embodiment will now be described with reference to FIGs. 5 and 8. In FIG. 8, reference character H represents a half of a vertical cross section of an electronic lens, and reference character V represents a half of a horizontal cross section thereof.

When electrical potentials are applied to various electrodes constituting the electron gun, unipotential auxiliary electronic lenses (not shown) are produced among the first, second and third focusing electrodes 24, 25 and 26. As shown in FIG. 8, a first quadrupole lens Q1 is selectively produced between the third and fourth focusing electrodes 26 and 27 in accordance with landing positions of electron beams on a phosphor screen, a second quadrupole lens Q2 is produced between the fourth and fifth focusing electrodes 27 and 28, and a main lens ML having a focus lens and a convergence lens is produced between the fifth focusing electrode 28 and the final accelerating electrode 29.

The intensity and focus of electronic lenses produced between the respective electrodes as described above may differ in accordance with landing positions of electron beams, which will now be described.

First, when the electron beams emitted from the electron gun land onto the central part of the phosphor screen, a dynamic focus voltage VFd which is substantially equal to the focus voltage VF is applied to the fourth focusing electrode 27. Therefore, unipotential electrostatic lenses are produced among the first, second and third focusing electrodes 24, 25 and 26, and a bipotential main lens ML is produced between the fifth focusing electrode 28 and the final accelerating electrode 29. However, the first and second quadrupole lenses Q1 and Q2 are not produced between the third and fourth focusing electrodes 26 and 27 and between the fourth and fifth focusing electrodes 27 and 28.

The fifth focusing electrode 28 and the final accelerating electrode 29 constituting the main lens ML include an external electrode (not shown) having a large-diameter electron beam through-hole and an internal electrode (not shown) having small-diameter electron beam through-holes. The focus lens and the convergence lens are produced by these through-holes.

Thus, the electron beams emitted from the cathode 21 are preliminary-focused and accelerated by the unipotential auxiliary electronic lens and then focused by the focus and convergence lenses of the main lens ML to then land on the central part of the phosphor screen.

When the electron beams emitted from the electron gun are land onto the peripheral part of the phosphor screen, a dynamic focus voltage VFd which is higher than the focus voltage VF applied to the fourth focusing electrode 27. Therefore, auxiliary electronic lenses are produced among the first, second and third focusing electrodes 24, 25 and 26. The first quadrupole lens Q1 is produced between the third and fourth focusing electrodes 26 and 27, and the second quadrupole lens Q2 is produced between the fourth and fifth focusing electrodes 27 and 28. Also, the main lens ML including a focus lens and a convergence lens is produced between the fifth focusing electrode 28 and the final accelerating electrode 29.

Here, the first and second quadrupole lenses Q1 and Q2 are produced by vertically elongated electron beam through-holes 26*u* and 27*u* (see FIGS. 6 and 7) and circular electron beam through-holes 27*i* and 28*i*, respectively, that is, the first and second quadrupole lenses Q1 and Q2 are asymmetrical. That is to say, the first quadrupole lens Q1 has a relatively stronger divergent force in a horizontal direction and a weaker convergent force in a vertical direction. The second quadrupole lens Q2 has a relatively stronger convergent force, in particular, a stronger divergent force in a vertical direction.

Thus, the electron beam emitted from the cathode 21 is preliminary-focused and accelerated while passing through the auxiliary electronic lens and then focused by the first and second quadrupole lenses Q1 and Q2. Here, the vertical components of the electron beam is weakly focused while passing through the first quadrupole lens Q1 to then be incident into the second quadrupole lens Q1 with a . smaller angle of incidence. The electron beam is again subjected to a strong divergent force in a vertical direction at the second quadrupole lens Q2. Even through the electron beam is subjected to vertically strong divergent force at the second quadrupole lens Q2, since the angle of incidence of the electron beam is small, the electron beam is less affected by spherical aberration.

The horizontal components of the electron beam is subjected to a horizontally strong divergent force by the first quadrupole lens Q1 to then be incident into the peripheral part of the second quadrupole lens Q2 at which the electron beam is again subjected to a relatively strong convergent force by the second quadrupole lens Q2.

The electron beam subjected to the convergent force and the divergent force becomes longer in a vertical direction. The vertically elongated electron beam is focused and accelerated while passing through the main lens ML produced between the fifth focusing electrode 28 and the final accelerating electrode 29 and then deflected by a deflection magnetic field of a deflection yoke to then land on the peripheral part of the phosphor screen. Since the vertically elongated electron beam is enforced with a convergent force in a vertical direction by a Lorentz effect when it passes through the deflection magnetic field, a halo or moire phenomenon can be prevented when the electron beam lands on the peripheral part of the phosphor screen.

The diameters of the circular electron beam through-holes 27*i* and 28*i* formed on the entering surfaces of the fourth and fifth focusing electrodes 27 and 28 are substantially the same as the horizontal widths of the electron beam through-holes 26*u* and 27*u* formed on the emitting surfaces of the third and fourth focusing electrodes 26 and 27. Thus, it is possible to prevent the vertical convergent force of the quadrupole lenses from weakening. Further, the dynamic focus voltage can be reduced by about 20% or more, compared to the conventional art.

Figure 9:
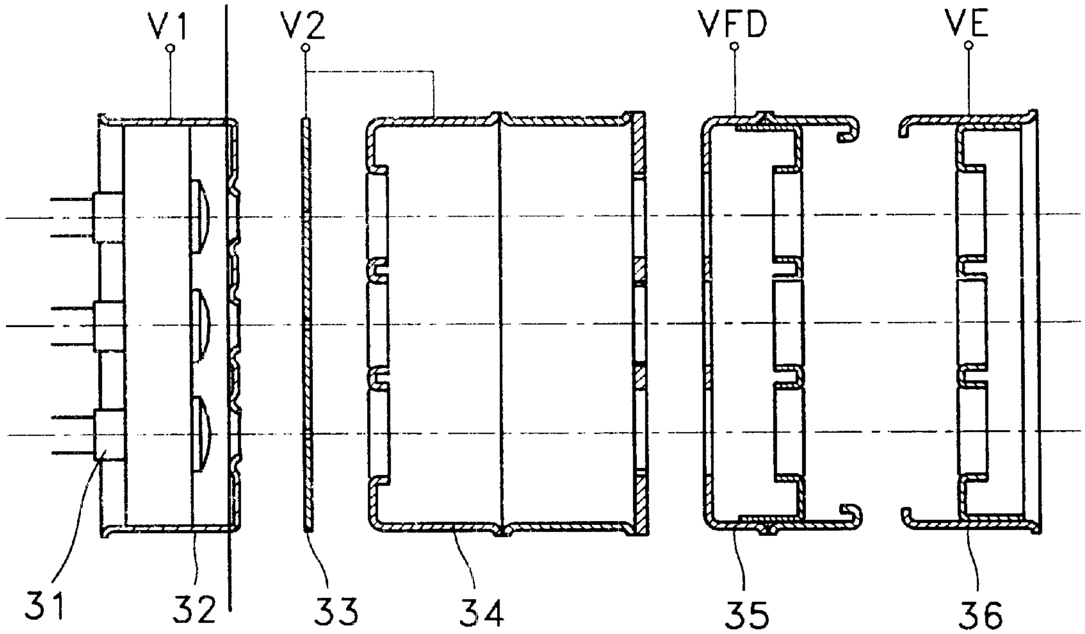
FIG. 9 is a cross-sectional view illustrating an electron gun for a cathode ray tube according to another embodiment of the present invention.

FIG. 9 illustrates an electron gun for a cathode ray tube according to another embodiment of the present invention.

The electron gun according to this embodiment includes a cathode 31, a control electrode 32 and a screen electrode 33, which constitute a triode, first and second focusing electrodes 34 and 35, which constitute an auxiliary lens and a quadrupole lens, and a final accelerating electrode 36 installed adjacent to the second focusing electrode 35 and constituting a main lens.

Figure 10:
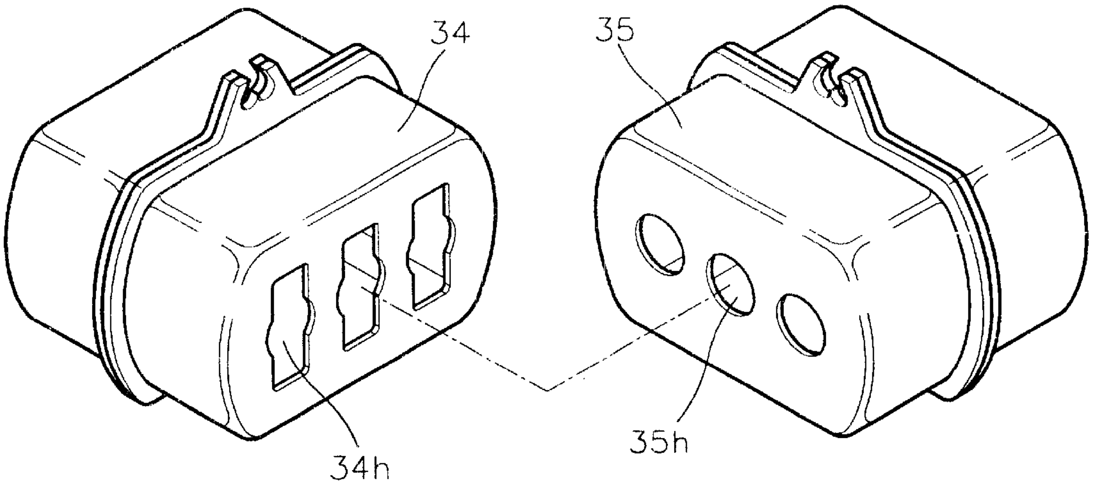
FIG. 10 is an exploded perspective view of electrodes employed in the electron gun shown in FIG. 9.
Figure 11:
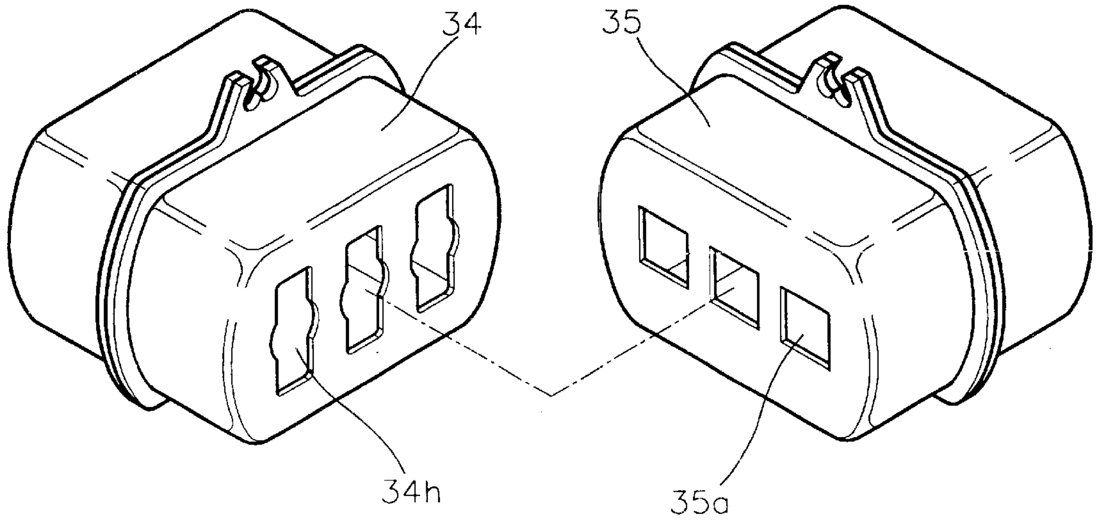
FIGS. 11 through 13 are exploded perspective views of another examples of electrodes employed in the electron gun shown in FIG. 9.

Electron beam through-holes which form the quadrupole lens in accordance with application of voltages to be described later, are formed on an emitting surface of the first focusing electrode 34 and an entering surface of the second focusing electrode 35. In other words, as shown in FIGS. 10 and 11, vertically elongated electron beam through-holes 34*h* through which three electron beams pass are formed through an emitting surface of the first focusing electrode 34, and circular electron beam through-holes 35*h* or regular-polygonal (square, here) electron beam through-holes 35*a* are formed through an entering surface of the second focusing electrode 35. The central parts of the vertical edges of the vertically elongated electron beam through-holes 34*h*, may be recessed. Also, the electron beam through-holes 35*a* are preferably square.

Figure 12:
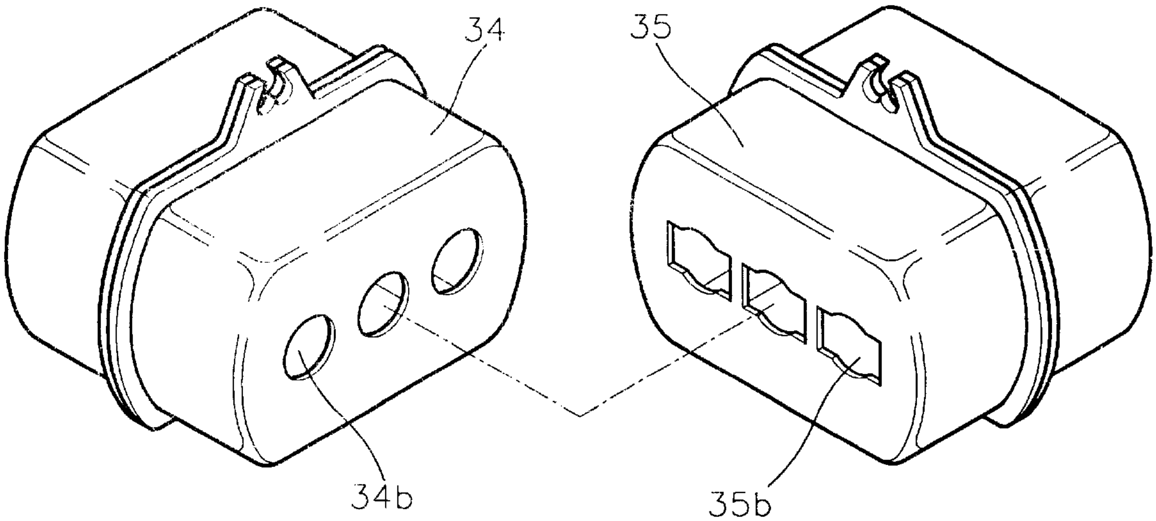
Figure 13:
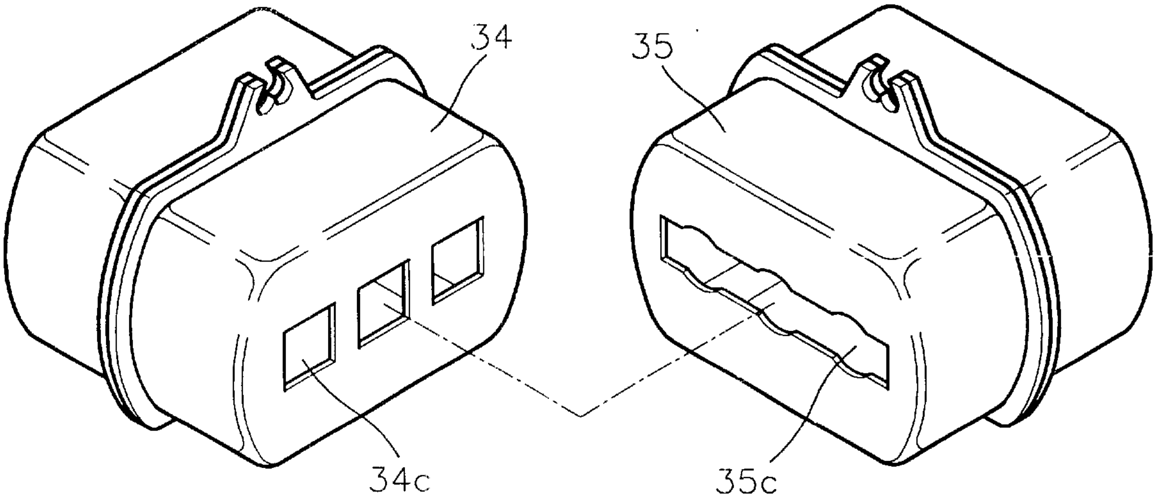

As another example of through-holes for forming a quadrupole lens, as shown in FIGS. 12 and 13, circular or regular-polygonal electron beam through-holes 34*b* or 34*c* are formed through an emitting surface of the first focusing electrode 34, and horizontally elongated electron beam through-holes 35*b* or a large-diameter horizontally elongated electron beam through-hole 35*c* through which three electron beams pass, may be formed through-an entering surface of the second focusing electrode 35.

During operation of the electron gun according to this embodiment, as shown in FIG. 9, a first static voltage V1 is applied to the control electrode 32, a second static voltage V2 higher than the first static voltage V1 is applied to the screen electrode 33 and the first focusing electrode 34. A parabola dynamic focus voltage VFD varying synchronously with a deflection signal is applied to the second focusing electrode 35, and a high-voltage anode voltage VE is applied to the final accelerating electrode 36. As voltages are applied as described above, electronic lenses are produced among the respective electrodes.

Figure 14:
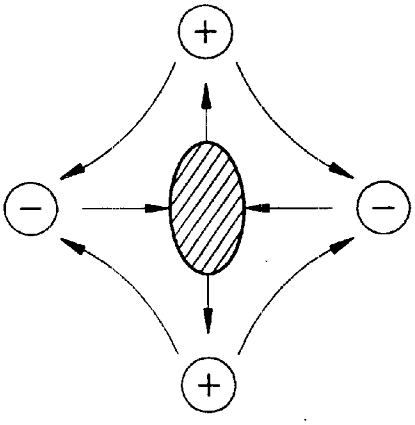
FIG. 14 illustrates convergent and divergent forces applied to the cross-sections of electron beams passing through an electronic lens produced by the electron gun shown in FIG. 9.

When the electron beam emitted from the electron gun is projected onto the peripheral part of the phosphor screen, the dynamic focus voltage VFD varying synchronously with the deflection signal is applied to the second focusing electrode 35. Thus, a quadrupole lens is produced by the vertically elongated electron beam through-holes 34*h* and circular electron beam through-holes 35*h* of the first and second focusing electrodes 34 and 35, and a main lens is produced between the second focusing electrode 35 and the final accelerating electrode 36. If lenses are formed in such a manner, the electron beam emitted from the cathode 31 is subjected to a divergent force in a vertical direction and a convergent force in a horizontal direction so that it becomes vertically long, as shown in FIG. 14.

The vertical elongation of the electron beam compensates for horizontal elongation of the electron beam due to the barrel of the deflection yoke and a pincushion magnetic field. Therefore, a halo phenomenon of a cross-section of the electron beam landing on the peripheral part of the phosphor screen can be prevented, thereby improving the resolution of a picture image.

According to the electron gun for a color cathode ray tube of the present invention, electron beam through-holes for forming a quadrupole lens are formed in vertically long and circular shapes, thereby decreasing a dynamic focus voltage, reducing the cost for manufacturing electrodes and increasing reliability in view of the quality of electrodes. In particular, since distortion of an electron beam due to a deflection magnetic field can be reduced, uniform cross-sections of the electron beam can be obtained throughout the phosphor screen.

Although the present invention has been described through embodiments illustrated in the drawings, these embodiments are provided by way of examples only and variations may be done by one skilled in the art within the scope of the invention.

What is claimed is:

1. A dynamic focus electron gun for a cathode ray tube, said electron gun comprising, in sequence along a longitudinal direction thereof:

a cathode, a control electrode and a screen electrode, which constitute a triode;

a first focusing electrode having three circular electron beam through-holes formed through its emitting surface;

a second focusing electrode constituting a quadrupole lens together with the first focusing electrode and having three horizontally elongated electron beam through-holes formed through its entering surface facing the emitting surface of the first focusing electrode; and a final accelerating electrode installed adjacent to the second focusing electrode and constituting a main electronic lens together with the second focusing electrode.

2. A dynamic focus electron gun for a cathode ray tube, said electron gun comprising, in sequence along a longitudinal direction thereof:

a cathode, a control electrode and a screen electrode, which constitute a triode;

first and second focusing electrodes;

a third focusing electrode having vertically elongated electron beam through-holes formed through its emitting surface;

a fourth focusing electrode having circular electron beam through-holes formed through its entering surface facing the emitting surface of the third focusing electrode and vertically elongated electron through-holes formed through its emitting surface;

a fifth focusing electrode having circular electron beam through-holes formed through its entering surface facing the emitting surface of the fourth focusing electrode; and a final accelerating electrode installed adjacent to the fifth focusing electrode, and wherein a static voltage is applied to the screen electrode and the second focusing electrode, a focus voltage higher than the static voltage is applied to the first and fourth electrodes, and a dynamic focus voltage varying synchronously with a deflection signal and equal to or higher than the focus voltage is applied to the third and fifth focusing electrodes.

3. A dynamic focus electron gun for a cathode ray tube, said electron gun comprising, in sequence along a longitudinal direction thereof:

an electron beam generating electrode assembly for generating electron beams and transmitting the electron beams in the longitudinal direction of said electron gun;

first, second, and third focusing electrodes installed sequentially downstream of the electrode assembly, the first and second focusing electrodes together constituting a quadrupole lens, the second and third focusing electrodes together constituting another quadrupole lens; and a final accelerating electrode installed downstream of the third focusing electrode and constituting a main electronic lens together with the third focusing electrode;

wherein the first focusing electrode has a first set of beam holes formed on an emitting surface thereof facing an entering surface of the second focusing electrode on which a second set of beam holes are formed, the first set including beam holes elongated in the vertical direction while the second set including beam holes having a dimension in the vertical direction not smaller than in the horizontal direction; and the third focusing electrodes has a third set of beam holes formed on an entering surface thereof facing an emitting surface of the second focusing electrode on which a fourth set of beam holes are formed, the fourth set including beam holes elongated in the vertical direction, while the third set including beam holes having a dimension in the vertical direction not smaller than in the horizontal direction.

4. The electron gun of claim 3 wherein a focus voltage is applied to the second focusing electrode, and a dynamic focus voltage varying synchronously with a deflection signal and equal to or higher than the focus voltage is applied to the first and third focusing electrodes.

* * * * *